Aug. 14, 1934.  O. OSBORN  1,970,183
CUTTING AND WRAPPING DEVICE
Filed Sept. 8, 1931

INVENTOR:
OMER OSBORN,
BY
Fad W Lauir
ATTORNEY.

Patented Aug. 14, 1934

1,970,183

UNITED STATES PATENT OFFICE 1,970,183

CUTTING AND WRAPPING DEVICE

Omer Osborn, Los Angeles, Calif.

Application September 8, 1931, Serial No. 561,646

4 Claims. (Cl. 93—2)

My invention relates to cutting and wrapping devices, and more particularly to a device for cutting or forming small portions of substances and then wrapping each of these portions.

In order to illustrate the advantages and utility of the device of my invention, I will describe that embodiment which is adapted to cut and wrap butter, although my invention may be embodied in various forms capable of dividing and wrapping other substances.

It is the common practice in establishments for vending foods to the public to cut cubes of butter usually weighing approximately one-fourth of a pound into slices, and then place these slices of butter in a receptacle filled with ice and water during the period of time between the cutting and serving of the butter. In such establishments it is not an uncommon practice for these slices of butter to be contaminated to some extent by contact with human hands between the cutting and consumption of the butter.

It is an object of my invention to provide a device which will better form the butter into small pats and wrap each of these pats or slices separately in a sanitary covering without the butter being touched by human hands during the process.

It is a further object of my invention to provide a device which improves the appearance of small slices or pats of butter by enclosing them in an attractive wrapping.

More specifically, it is a purpose of my invention to provide a device which divides butter into small portions and encloses each portion in a wrapping bearing thereon indicia which may be of an advertising or a decorative nature.

Figure 1:
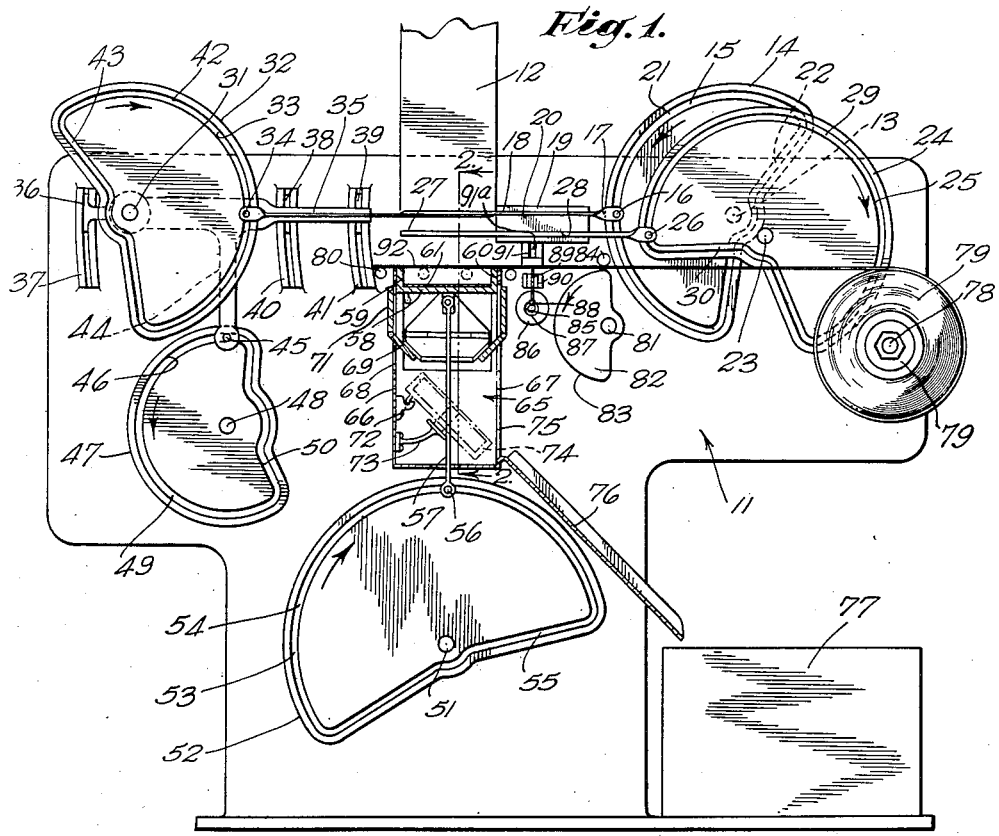

Other objects and advantages will be made evident in the following description, which may be better understood with reference to the accompanying drawing, in which Fig. 1 is an elevational view of the apparatus of my invention.

Figure 2:
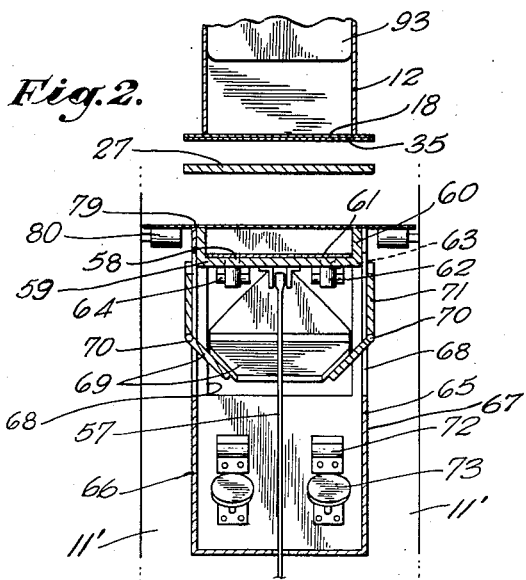

Fig. 2 is a sectional view taken on the line 2—2 of Fig. 1.

Referring to the drawing, which is for illustrative purposes only, the numeral 11 indicates a supporting frame comprising a pair of perpendicular walls 11' secured together in spaced relationship by cross members not illustrated. The walls 11' may be so formed as to completely enclose the apparatus, or only one wall may be utilized. Attached to the walls 11' adjacent the upper end thereof is a supply box or chute 12. The chute 12 has that cross-sectional shape which it is desired to give to the small pats of butter. In Fig. 2 the chute 12 is illustrated as being substantially square in cross-section so that the outline of the pat of butter formed by the device will likewise be substantially square. Rotatably mounted on the frame walls 11' is a cutter shaft 13 to which there is non-rotatably connected a cutter cam 14. The cutter cam 14 is provided with a slot 15 around its periphery, in which there is slidably disposed a roller 16. The roller 16 is rotatably attached to a cutter 18, the blade of which is in a horizontal plane. A guide member 19 is secured to the frame walls 11' and provided with a horizontal slot 20 in which the cutter 18 is slidably disposed. As illustrated in the drawing, the slot 15 of the cutter cam 14 provides a semi-circular portion 21 and a connecting portion 22 extending between ends of the semi-circular portion 21 adjacent the shaft 13.

Rotatably mounted upon the wall 11 near the cutter shaft 13 is a retaining member shaft 23, to which there is non-rotatably attached a retaining member cam 24. The cam 24 is provided with a slot 25 adjacent its periphery, in which there is slidably disposed a roller or pin 26. The pin 26 is secured to one end of a supporting or retaining member 27, the other end of which extends under the chute 12. The guide member 19 is provided with a horizontal retaining member slot 28 in which the retaining member 27 is slidably disposed. As illustrated in the drawing, the slot 25 of the cam 24 comprises a circular portion 29 extending over an arc of approximately 270°, and a connecting portion 30 extending between the ends of the circular portion 29 and adjacent the retaining member shaft 23.

Disposed adjacent one of the walls 11' on that side of the chute 12 opposite the retaining member shaft 23, is a conveying member shaft 31 upon which there is non-rotatably mounted a conveying member cam 32. The cam 32 is provided with a slot 33 adjacent its periphery in which there is slidably disposed a pin or roller 34. The roller 34 is attached to a conveying member 35 which extends horizontally under the cutting member 18. The conveying member 35 extends to the left of the pin or roller 34 and terminates in a projection 36 which extends into a guide member 37 secured to one of the frame walls 11'. The conveying member 35 is likewise provided with projections 38 and 39 between the conveying member cam 32 and the chute 12. The projections 38 and 39 extend into guide members 40 and 41 likewise secured to one of the frame walls 11', so that the conveying member 35 is secured to said wall against separation therefrom and in such a manner that it may move vertically relative thereto. The conveying member shaft 31 is rotatably attached to the conveying member 35 adjacent the projection 36 and its opposite ends extend through suitable openings in the walls 11' in such a manner that it may move vertically relative thereto a distance substantially equal to the effective length of the guide members 37, 40, and 41. The slot 33 of the cam 32 comprises a circular portion 42 which describes an arc of slightly more than 180° and a connecting portion 43 extending between the ends of the circular portion 42 and adjacent the conveying member shaft 31.

Extending downwardly from the conveying member 35 between the pin or roller 34 and the conveying member shaft 31 is a rigid arm 44. Secured to the lower end of the arm 44 is a pin or roller 45 which is disposed in a slot 46 of an auxiliary cam 47. The auxiliary cam 47 is non-rotatably attached to an auxiliary cam shaft 48 which is rotatably mounted on the walls 11'. The slot 46 comprises a circular portion 49 describing an arc of somewhat more than 180° and a connecting portion 50 extending between the ends of the circular portion 49 and adjacent the auxiliary cam shaft 48.

Rotatably mounted on the walls 11' below the chute 12 is a receptacle actuating shaft 51 to which there is non-rotatably secured a receptacle actuating cam 52. The cam 52 is provided with a slot 53 adjacent its periphery, the slot 53 comprising a circular portion 54 describing an arc of somewhat more than 180° and a connecting portion 55 extending between the ends of the circular portion 54 and adjacent the shaft 51. Disposed in the slot 53 is a pin or roller 56 which is mounted in the lower end of a connecting arm 57. The upper end of the connecting arm 57 is pivotally mounted upon the bottom 58 of a receiving chamber or wrapping receptacle 59. The receptacle 59 includes side walls 60 extending upwardly from the bottom 58 a distance substantially equal to the thickness desired for the small pats of butter. The area described by the side walls 60 is substantially equal to the cross-sectional area of the chute 12 of the receptacle 59 and in direct vertical alignment with the chute 12.

Disposed within the receptacle 59 is an auxiliary bottom 61 having two pins 62 extending downwardly therefrom and through openings 63 in the bottom 58. The bottom 58 is provided with two engagers 64 upon its lower surface and adjacent one edge thereof. The receptacle 59 is disposed within a vertical guide 65 which includes vertical side walls 66 and 67. The side walls 66 and 67 and the frame walls 11' comprise guide means for the walls of the receptacle 59 during its vertical movement due to the rotation of the receptacle actuating cam 52.

Extending into the vertical guide 65 through openings 68 in the walls 66 and 67, are declining arms 69. Similar declining arms 69 extend into the guide 65 from the front and rear thereof. Each of the declining arms 69 is provided at its upper end with a pin 70 to which there is secured an upper arm 71. Each of the upper arms 71 is so associated with its companion declining arm 69 that the two are prevented from relative movement to define a more obtuse angle between them, while they are free to so move as to diminish the angle between them. It should be obvious that as the receptacle actuating cam 52 is rotated the connecting arm 57 and the receptacle 59 will be moved downwardly, the bottom 58 of the receptacle 59 engaging the declining arms 69. As the declining arms 69 are moved outwardly, the upper arms 71 are caused to swing through the opening 68 of the walls of the guide 65 and to assume a position substantially covering the receptacle 59. Each of the upper arms 71 is in the form of a triangular plate so that when they are positioned over the receptacle 59 they do not overlap each other. The declining arms 69 and the upper arms 71 are so associated with each other and with the walls of the guide 65 that the lower arms 69 always tend to assume the positions in which they are illustrated in Fig. 1, when the upper arms 71 are vertical.

Attached to the inner surface of the side walls 66 of the guide 65 are two dogs 72 adapted for contact with the engagers 64. Likewise attached to the inner surface of the side walls 66 are two inwardly extending stops 73. The stops 73 are adapted for engagement with the pins 62 secured to the auxiliary bottom 61. The dogs 72 and the stops 73 are so spacially related to each other that the dogs 72 by contact with the engagers 64 cause the receptacle 59 upon its continued downward movement to be tilted into the position illustrated by the dotted lines 74 of Fig. 1. When the receptacle 59 is in this position, which is the lowermost position it is capable of assuming, the stops 73 engage the pins 62, forcing the auxiliary bottom 61 flush with the top of the side walls 60, thus ejecting from the receptacle any material which may be contained therein. An opening 75 is provided in the wall 67 of the guide 65 so that the material thus ejected from the receptacle 59 may pass therethrough onto a slide 76 leading to a receiving member 77.

Attached to the wall 11 is a spool supporting shaft 78 upon which there is rotatably mounted a spool 79 of a wrapping medium 79'. The wrapping medium 79' is in the form of a strip, of a width somewhat greater than the width of the receptacle 59 and is led horizontally from the spool 79 across rollers 80 rotatably mounted in walls 11' and across the receptacle 59. As illustrated in the drawing, the rollers 80 are flush with the upper ends of the walls 60 of the receptacle 59 so that the wrapping medium contacts the upper ends of these walls.

Rotatably mounted on the walls 11' between the spool supporting shaft 78 and the receptacle 59 is a feeder cam shaft 81 upon which there is non-rotatably mounted a feeder cam 82. The feeder cam 82 is provided with a circular cam surface 83 of a length substantially equal to the length of the wrapping medium in which it is desired to wrap each pat of butter. The cam surface 83 is pressurally engaged by a roller 84 rotatably mounted on the walls 11' so that the cam surface 83 and the roller 84 cooperate in feeding the wrapping medium across the receptacle 59.

Rotatably mounted in the walls 11' between the feeder cam shaft 81 and the receptacle 59 is a cutter cam shaft 85 to which there is secured a cutter cam 86. The cutter cam 86 is provided with a circular groove 87 in which a pin 88 is slidably disposed. Attached to the pin 88 is a vertical arm 89, the upper end of which is provided with a cutting edge. The arm 89 extends through a guide member 90 preferably secured to the rear wall 11' and at its uppermost position cooperates with a slot 91a in a block 91 secured to the wall 11' in cutting a portion 92 from the wrapping medium.

The cutter shaft 13, the retaining member shaft 23, the conveying member shaft 31, the auxiliary cam shaft 48, and the receptacle actuating shaft 51 are rotated by any suitable means such as a gear or belt and pulley mechanism. If it is desired, the cutter shaft 13 and the conveying member shaft 31 may be attached to gears in meshing relationship with each other so that the conveying member 35 moves upwardly and downwardly in an arc about the cutter shaft 13, thus retaining these two gears in their meshing relationship. In the shapes in which the retaining member cam 24, the cutter cam 14, the conveying member cam 32, the auxiliary cam 47, and the receptacle actuating cam 52 are illustrated, these cams are adapted for rotation at the same angular velocity. However, it should be obvious that by altering the relative length of the cam surfaces of these members the cams may be actuated at any velocity relative to each other that may be desired.

The operation of that embodiment of my invention hereinbefore set forth will now be described.

The material to be separated into small portions is placed in the chute 12 and a plunger 93 is disposed in the chute 12 above the butter or other material to be divided. The plunger 93 operates to force the butter from the lower end of the chute 12, and may be actuated in any suitable manner. In the embodiment illustrated, I prefer to so weight the plunger 93 that it is actuated by gravity. When the various cams of the device of my invention have rotated approximately 90° from the position in which they are illustrated in Fig. 1, the conveying member 35 will be moved downwardly to its lowermost position, due to the rotation of the auxiliary cam 47, and will remain extended under the chute 12. During this movement of the conveying member 35 the retaining member 27 is moved outwardly from under the chute 12 due to the rotation of the retaining member cam 24. This movement of the cam 24 and the retaining member 27 permits the conveying member 35 to assume its lowermost position adjacent the upper ends of the walls 60 of the receptacle 59. During this movement of the retaining member 27 and the conveying member 35 the cutting member 18 and the receptacle 59 remain stationary.

During the second 90° of rotation of the various cams, the conveying member 35 is moved to the left, due to the rotation of the conveying member cam 32, and retains its lowermost position due to the rotation of the auxiliary cam 47. During this same period the retaining member 27 is moved to the left into the position in which it is illustrated in Fig. 1 under the chute 12, due to the rotation of the retaining cam 24. Likewise, during this period the cutting member 18 is drawn to the right from under the chute 12 by the rotation of the cutter cam 14. This movement of the cutter 18 permits the plunger 93 to force butter from the chute 12 downwardly onto the surface of the retaining member 27. Likewise, during this period the receptacle 59 is moved from its uppermost position, illustrated by the dotted lines 74 of Fig. 1, by the rotation of the receptacle actuating cam 52.

During the third 90° of rotation of the various cams the conveying member 35 is retained in its uppermost position to the left of the chute 12 and the retaining member 27 remains underneath the chute 12. The cutting member 18 during this period is moved to the left, assuming its position underneath the chute 12, as illustrated in Fig. 1. During this movement the cutting member 18 severs from the body of material contained within the chute 12 that portion which has extended therefrom into contact with the retaining member 27. The receptacle 59 during this third 90° of rotation has remained in its lowermost position due to the rotation of the receptacle actuating cam 52.

During the fourth 90° of rotation, the conveying member 35 is retained in its uppermost position and moved from its retracted position, to the right under the chute 12 and immediately adjacent the lower surface of the cutting member 18, as illustrated in the drawing. During this period the cutting member 18 remains underneath the chute 12 and the retaining member 27 remains in the position illustrated in the drawing. Likewise, during this period the receptacle 59 is moved upwardly from the position in which it is illustrated by the dotted lines 74 to the position indicated by the full lines of Fig. 1.

During the fifth 90° of rotation, the receptacle 59 remains stationary, the cutting member 18 remains under the chute 12, the retaining member 27 is drawn to the right from underneath the chute 12, and the conveying member 35 remains underneath the chute 12 and moves downwardly, forcing the pat of butter severed by the cutting member 18 into the receptacle 59. Due to the fact that during each 360° of rotation of the other cams, the feeding cam 82 has rotated 180°, there is extended across the top of the receptacle 59 a portion 92 of the wrapping material, which is severed from the wrapping material contained on the spool 79 by the cutting blade 89. As the conveying member 35 forces the pat of butter into the receptacle 59, the wrapping material 92 is likewise forced into the receptacle 59 with its edges extending vertically on four sides thereof. While the wrapping material 92 is depressed in the receptacle 59 folds may be formed in the wrapping material 92 adjacent the inner section of the side wall 60 of the receptacle 59. Due to the fact that the slice of material is usually rather thin, such folds are not large and may in many instances be not objectionable. However, if it is desired to eliminate such folds the wrapping medium 92 may be provided in such form that small triangles are cut from the wrapping medium, these triangles being positioned adjacent the corners of the receptacle 59 with their apexes directed towards the middle of the wrapping medium 92. Likewise a slot may be provided at the intersection on the side walls 60 of the receptacle 59, thus permitting said small folds to protrude from the receptacle 59 until such time as the wrapping medium is folded upon the top of the pad of butter contained in the receptacle 59.

During the sixth 90° of rotation of the cams the conveying member 35, the cutting member 18, and the retaining member 27 are actuated in the same manner as previously described for the second 90° of cam rotation, and the receptacle 59 is moved downwardly into the position illustrated by the dotted lines 74. During this movement of the receptacle the declining arms 69 are engaged, causing the upper arms 71 to fold over the top of the receptacle 59, thus folding the wrapper 92 in such a manner as to completely enclose the pat of butter contained in the receptacle 59. While that embodiment of my invention which is illustrated in the drawing causes the wrapping medium extending from all four sides of the receptacle 59 to be folded upon the upper surface of the pat of butter at the same time. It should be obvious that by vertically spacing the various pairs of arms 69 and 71, the upper arms 71 may be caused to fold the wrapping medium extending from the different sides of the receptacle 59 upon the upper surface of the pat of butter at different times if it is desired. After the pat of butter is thus completely wrapped, the receptacle 59 continues its downward movement until the engagers 64 contact the dogs 72, at which time the receptacle 59 is tilted so that the pins 62 engage the arms 73, thus moving the false bottom 61 of the receptacle 59 upwardly until it is substantially flush with the upper surface of the walls 60 of the receptacle 59. The wrapped pat of butter is then ejected from the receptacle 59 and passes along the slide 76 to the receiving member 77.

During the seventh 90° of rotation of the cams the cutting member 18, the conveying member 35, and the retaining member 27 move in the same manner as that previously described for the third 90° of cam rotation, and the receptacle 59 remains in its lowermost position. Likewise, during the eighth 90° of cam rotation, the cutting member 18, the conveying member 35, and the retaining member 27 are moved in the manner which has been described for the fourth 90° of cam rotation, and the receptacle 59 is moved from its lowermost position to its uppermost position underneath the severed portion 92 of the wrapping medium and available for the reception of a second pat of butter. As the receptacle 59 moves upwardly, it contacts the upper arms 71 and moves them into the vertical position in which they are illustrated, thus causing the declining arms 69 to likewise assume the positions in which they are illustrated in Fig. 1.

The wrapping medium contained upon the spool 79 may be formed of paper, cloth, or any other suitable material, and may bear thereon indicia which is of solely decorative value or which combines decorative and advertising values.

It should be evident that by my invention I have provided a device which quickly and effectively separates a mass of butter into small pats and wraps each of these pats separately without the pats coming in contact with human hands. It should likewise be apparent that the device of my invention improves the appearance of an individual pat of butter by entirely enclosing it within a wrapper bearing indicia of an advertising or decorative value. Moreover, by entirely enclosing the individual pat of butter within a wrapping in the manner described, the device of my invention provides individual pats of butter which are protected from contact with the air, and thus diminishes the contamination of the butter by the absorption of odors or bacteria from the atmosphere.

While that embodiment of my invention hereinbefore illustrated and described is fully capable of performing all of the objects and providing all of the advantages primarily stated, there are various other embodiments of my invention likewise capable of performing these objects and providing these advantages, and I therefore wish my invention to be understood as not restricted to the particular construction and arrangement of parts hereinbefore described.

I claim as my invention:

1. In a device for cutting material, the combination of: a supply member having a discharge opening; pressure exerting means associated with said member for forcing said material out of said opening; walls forming sides and bottom of a receiving chamber; an auxiliary bottom movable relative to said walls; a cutting member movable from a position adjacent said opening and between said opening and said chamber to sever said material forced out of said opening and said chamber; a conveying member movable from a position adjacent said opening and said cutting member to a position immediately adjacent said chamber and a position outside of the line between said opening and said chamber; a supporting member movable into and out of the line between said opening and said chamber; means engageable with said auxiliary bottom for expelling said severed material from said chamber; and cam-actuated means for so moving said cutting member, said conveying member, and said supporting member that said supporting member supports a slice of said material until said conveying member contacts one surface of said slice and moves out of the line between said opening and said chamber during the travel of said conveying member to deposit said slice in said chamber.

2. In a device for cutting material and wrapping each slice separately, the combination of: a supply member having a discharge opening; pressure exerting means associated with said member for forcing said material out of said opening; walls forming sides and bottom of a receiving chamber; an auxiliary bottom movable relative to said walls; a cutting member movable from a position adjacent said opening and between said opening and said chamber to sever said material forced from said opening and said chamber; a conveying member movable from a position adjacent said opening and said cutting member to a position immediately adjacent said chamber and a position outside of the line between said opening and said chamber; a supporting member movable into and out of the line between said opening and said chamber; cam-actuated means for so moving said cutting member, said conveying member and said supporting member that said supporting member supports a slice of said material until said conveying member contacts one surface of said slice and moves out of the line between said opening and said chamber during the travel of said conveying member to deposit said slice in said chamber; means for extending a wrapper across said chamber walls before said slice is deposited therein; folding means associated with said chamber walls, said walls and said folding means being relatively movable, and said folding means being actuated by said relative movement for folding said wrapper upon said slice; means for imparting relative movement to said walls and said folding means; and means engageable with said auxiliary bottom for expelling said severed material from said receiving chamber.

3. In a device for cutting material and wrapping each slice separately, the combination of: a supply member having a discharge opening; pressure exerting means associated with said member for forcing said material out of said opening; walls forming a receptacle having sides and bottom; an auxiliary bottom movable relative to said walls; a cutting member movable from a position adjacent said opening and between said opening and said receptacle to a position outside the line between said opening and said receptacle; a conveying member movable from a position adjacent said opening and said cutting member to a position immediately adjacent said receptacle and a position outside of the line between said opening and said receptacle; a supporting member movable into and out of the line between said opening and said receptacle; cam-operated means for so moving said cutting member, said conveying member, and said supporting member that said supporting member supports a slice of said material until said conveying member contacts one surface of said slice and moves out of the line between said opening and said receptacle during the travel of said conveying member to deposit said slice in said receptacle; means for extending a wrapper across said receptacle before said slice is deposited therein; folding means associated with said receptacle, said folding means being actuated by the movement of said receptacle to fold said wrapper around said slice in said receptacle; ejecting means engageable with said movable bottom of said receptacle to eject said slice after wrapping from said receptacle; and means for moving said receptacle.

4. In a device for cutting material and wrapping each slice separately, the combination of: a supply member having a discharge opening; pressure exerting means associated with said member for forcing said material out of said opening; walls forming sides and bottom of a receptacle, an auxiliary bottom movable relative to said walls; a cutting member movable from a position adjacent said opening and between said opening and said receptacle to a position outside the line between said opening and said receptacle; a conveying member movable from a position adjacent said opening and said cutting member to a position immediately adjacent said receptacle and a position outside of the line between said opening and said receptacle; a supporting member movable into and out of the line between said opening and said receptacle; cam-operated means for so moving said cutting member, said conveying member and said supporting member that said supporting member supports a slice of said material until said conveying member contacts one surface of said slice and moves out of the line between said opening and said receptacle during the travel of said conveying member to deposit said slice in said receptacle; means for extending a wrapper across said receptacle before said slice is deposited therein; folding means associated with said receptacle, said folding means being actuated by the movement of said receptacle to fold said wrapper around said slice in said receptacle, and said movable bottom being actuated by the movement of said receptacle to eject the wrapped slice from said receptacle; and means for moving said receptacle in timed relationship with the movement of said conveying member.

OMER OSBORN.